April 5, 1955  S. O. SUNDEN  2,705,458
PUMP
Filed Oct. 11, 1950
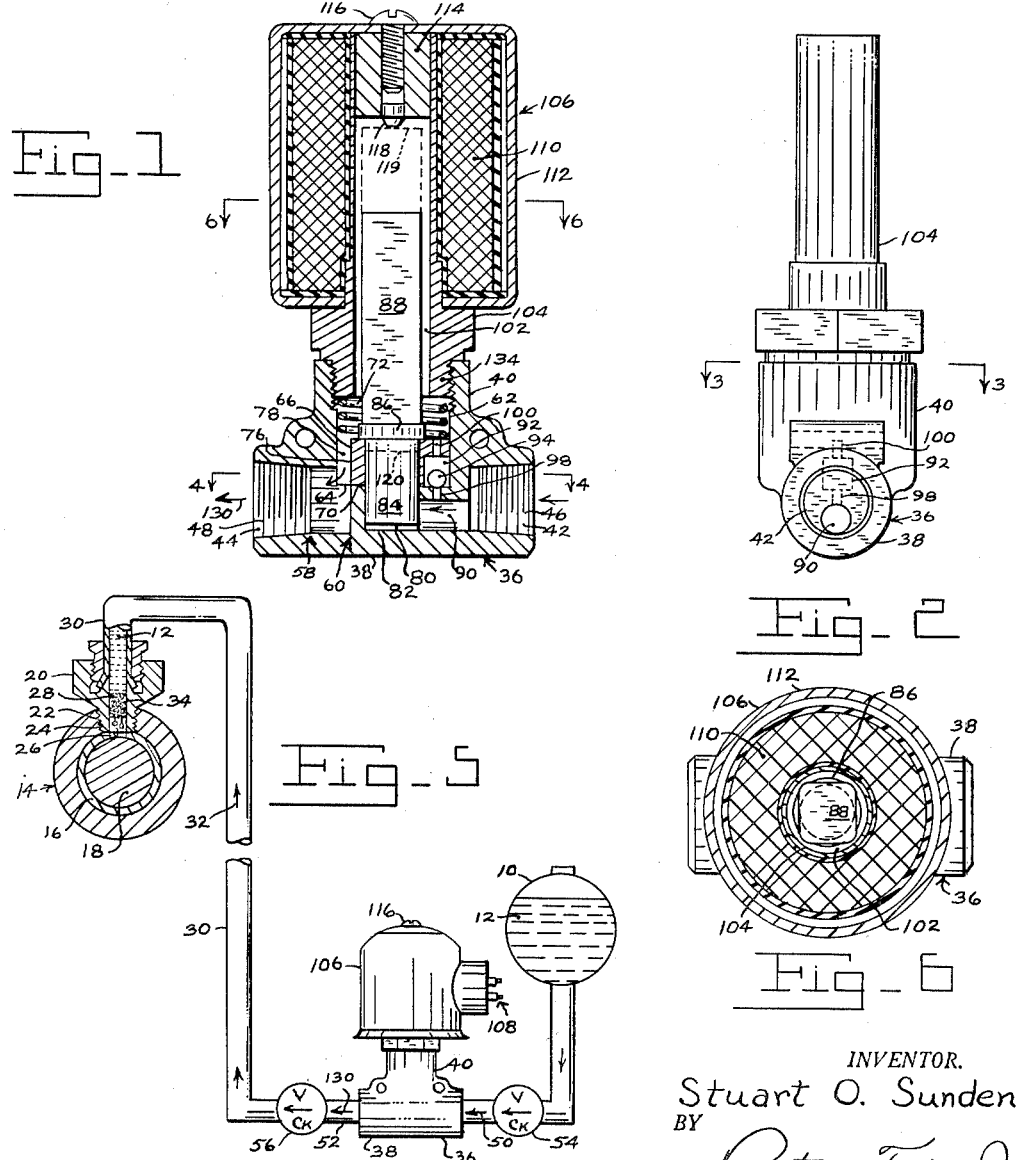
INVENTOR.
Stuart O. Sunden
BY Peter Fries, Jr.
ATTORNEY Patented Apr. 5, 1955

2,705,458

PUMP

Stuart O. Sunden, Noroton Heights, Conn., assignor of forty per cent to Peter Fries, Jr., New York, N. Y.

Application October 11, 1950, Serial No. 189,544

6 Claims. (Cl. 103—53)

This invention relates to pumping devices and systems and to lubricating devices and systems.

An object of the invention is to provide a novel and improved lubricating device by means of which a bearing or other machine element requiring lubrication may be adequately lubricated according to a predetermined pattern in precise accordance with its needs.

Another object of the invention is to provide a novel and improved lubricating device and system, in which lubricant from a source may be conveyed to a bearing or other part needing lubrication, in a continuous flow at a predetermined rate of flow of lubricant, or may be fed to the bearing or part in a series of pre-timed or predetermined individual shots or slugs of lubricant, or a combination of both forms of lubricant delivery.

A further object of the invention is to provide a novel and improved lubricating device and system in which there is a lubricant pumping device of novel construction, by means of which, under the influence of mechanical forces, lubricant from a source at a predetermined level may be conducted to a bearing or other part requiring lubrication and disposed at a higher level than the source, the delivery to the bearing being characterized as desired, by being under substantial pressurization or not, as needed, to satisfy the needs of the bearing.

Still another object of the invention is to provide a novel and improved fluid pumping device of unique construction and of simple design, in which fluid from a source may be drawn into the pumping device upon movement of a plunger inside the device, and in which movement of the plunger forces lubricant or other fluid out of the pumping device, the plunger being operable by simple means, such, for example, as an electrical solenoid, which may be actuated at regular or irregular intervals, either automatically or manually, it being a further feature that in the same machine, there may be several bearings or other parts having lubrication requirements differing greatly from each other, and for such machines, several such pumping devices may be employed, one for each such bearing to satisfy its particular needs.

Still a further object of the invention is to provide a novel and improved fluid pumping device of the type described, which may be employed in cooperation with a fluid permeable flow regulator of any type, including but not restricted to the types described in my pending patent applications Serial Number 78,943, filed March 1, 1949, and now abandoned, for Lubricating Systems and Devices; Serial Number 186,893, filed September 26, 1950, for Lubricating Systems and Devices and Methods of Making Same; and Serial Number 149,283, filed March 13, 1950, for Automatic Pump and Valve Control Device and Pumping System.

Still another object of the invention is to provide a novel and improved fluid and lubricant pumping device which has a minimum of parts, both movable and stationary, so that maintenance and inspection can be reduced to a negligible factor in the cost of operation of the device, the parts being of very simple construction and of low cost of manufacture.

These and other objects and advantages of the invention will become apparent from the following description of a preferred embodiment thereof as illustrated in the accompanying drawings, forming a part hereof, and in which, Figure 1 is a sectional elevational view of the assembled pumping device, as taken substantially on plane 1—1 of Figure 3, the solenoid elements being shown also.

Figure 2 is a right end elevational view of the device shown in Figure 1, omitting from the view the solenoid coil and housing.

Figure 3 is a top plan view of the pump housing such as might be seen looking downward substantially on plane 3—3 of Figure 2, omitting the movable pump plunger and plunger housing, and indicating in broken lines the outline of the upper portion of the pump plunger.

Figure 4 is a sectional plan view taken substantially on plane 4—4 of Figure 1, omitting from the view, for purposes of clarity, the movable valve ball shown in Figure 1.

Figure 5 is a partly schematic elevational view of the completely assembled pumping device with hood covering the solenoid, check valves on each side of the pumping device, a bearing to be lubricated connected by piping to the pump, and shown in section, and a lubricant reservoir connected to the pump.

Figure 6 is a sectional plan view taken substantially on plane 6—6 of Figure 1.

In the lubrication of machinery, shafts, bearings and the like, it is frequently necesary to feed the lubricant, oil and the like to the bearing or other machine part, under some predetermined degree of pressure. This may occur, for example, when the bearing or other part to be lubricated is at a level higher in elevation than the lubricant reservoir from which the lubricant is to be fed thereto. The requirements of a particular bearing may be such that it needs lubrication at regular or even irregular intervals, and pressure feed of lubricant to the bearing at the desired time, or for a predetermined time interval, may be desirable. Further, it may be desired to lubricate the bearing by means of droplet lubrication, described in my copending patent applications, (1) Serial Number 78,943, entitled Lubricating Systems and Devices, and (2) Serial Number 186,893, entitled Lubricating Systems and Devices and Methods of Making Same, and through a flow regulator and coordinating device of the type shown and described therein and illustrated in one aspect herein in Figure 5.

The present application discloses a pumping device which meets all these requirements and many more, both for lubricating purposes and for general pumping service. In order to understand clearly the nature of the invention, and the best means for carrying it out, reference may now be had to the drawings, in which like numerals denote similar parts throughout the several views.

As shown, there is a reservoir 10 containing oil 12 which is to be fed to the bearing 14 of a machine, not otherwise shown, but of any well known type, the bearing 14 having a sleeve 16, for example, in which the shaft 18 rotates. A plug housing 20 has its lower reduced end 22 threaded into a radial bore 24 formed through the wall of the bearing 14 in axial alignment with a corresponding opening 26 through the bearing sleeve 16. The plug housing 20 has an axial bore 28 connecting with a delivery pipe 30 through which oil is to be fed in the direction of arrow 32 to the bearing 14 for lubricating the same. If desired, in order to obtain droplet lubrication, as aforesaid, then a fluid-permeable flow regulating plug 34 may be disposed in the bore 28 as seen in Figure 5, so that the oil 12 which accumulates above the plug 34, will issue from the lower end of the plug 34 in the form of droplets as shown. The construction of the fluid-permeable flow regulating plug 34 has been described and illustrated in great detail in my said copending patent applications, Serial Numbers 78,943, and 186,893, as well as a number of suitable modified forms thereof, all of which may be employed herein also, and reference is made to that pair of applications for further details of said regulating plugs 34, this being a continuation of those applications.

It will also be understood of course, that lubricant 12 may also be delivered to the bearing 14 without the use of the fluid regulating plug 34, where so desired, and in that event, the fluid regulating plug 34 or any variation thereof as shown in said copending applications, may be omitted.

As shown, I employ a pump body 36, which may be formed for convenience by an intersecting horizontal cylindrical member 38 with a vertical cylindrical member 40. The lower pump body portion or cylinder 38 has axially aligned fluid inlet and discharge bores 42 and 44 which may be threaded as shown at 46 and 48 respectively for engagement with inlet and outlet fluid pipes 50 and 52, the fluid lubricant being delivered to pipe 50 and to the inlet 42 from the fluid reservoir 10, through check valve 54 which permits lubricant to flow only from right to left as seen in Figure 5. Fluid lubricant which is discharged from the discharge outlet 44 of the pump body 38, passes through the delivery pipe 52 and the check valve 56 on its way to the pipe 30 which carries it to the bearing 14 or any other machine part to be lubricated, or to some other container to which the oil is to be delivered, the check valve 56 allowing fluid flow therethrough only from right to left as seen in Figure 5, in the direction of its arrow.

I extend axially inwards as seen best in Figures 1 and 4, the bore 44 of the lower pump body 38, from location 58 to location 60, allowing this bore extension to remain unthreaded. I also form a vertical axial bore 62 through the upper pump body 40, down as far as location 64, substantially as shown in Figures 1 and 3 and 4, this bore 62 being threaded on its upper portion only, as shown in Figure 1. Inside this bore 62 I dispose a pump cylinder member 66. As shown, the pump cylinder member 66 has a cylindrical outer surface which fits snugly inside the lower unthreaded portion of bore 62, the top and bottom surfaces 68 and 70 being in mutually parallel planes at right angles to the axis of bore 62, so that the lower surface 70 of the cylinder member 66 rests upon the floor of the bore 62. A spring 72 presses downwards on the cylinder member 66, keeping it in position as shown, and a dowel pin 74 shown clearly in Figures 3 and 4, penetrates the cylinder member 66 from top to bottom and extends downwards therebeyond into the metal forming the floor of the bore 62 to maintain the cylinder member 66 against relative rotation about the axis of the bore 62 or partial undesired turning therein. As shown in Figures 1, 3 and 4, a chordal portion of the cylindrical side surface of the cylinder member 66 is cut away from top to bottom to form a plane surface 76. A fluid passageway or space 78 is thus formed between the chordal surface 76 of the cylinder member 66, and the adjacent cylindrical surface of the bore 62, so that oil is free to pass downwardly through this passageway 78 as seen in Figure 1.

As seen best in Figures 1, 3 and 4, I form a vertical bore 80 through the axis of the cylinder member 66 and continue it on downwards through the floor of the bore 62, substantially to location 82 shown in Figures 1 and 3. This bore 80 has a smaller diameter than that of bore 62, and forms the cylinder bore to receive the reciprocating pump piston 84, which is to reciprocate vertically therein as seen in Figure 1. The piston 84 has a collar 86 integral therewith at its upper end, and an upper extension member or plunger extension member 88 secured thereto and movable therewith, the plunger extension member 88 having preferably rounded corners and substantially rectangular cross section as seen in Figures 1, 3 and 6. The plunger extension member 88 is made of magnetic material such as iron or steel of any suitable composition well known for use as a magnetic solenoid plunger.

An eccentric bore 90 interconnects the fluid inlet bore 42 and the pump cylinder bore 82 as seen best in Figures 1 and 2, the communicating bore 90 being preferably disposed so that it is tangent substantially to the bottom of inlet bore 42 in the manner of Figure 2. A cage recess 92, shown clearly in Figures 1 and 4, is cut into the lower and side surfaces of the pump cylinder member 76, this recess being generally semi-cylindrical in shape, to receive the valve ball 94 disposed therein. For clarity of illustration, the ball 94 has only been shown in Figure 1, and has been omitted from the illustration of Figure 4, it being understood however, that it is actually present in the construction shown in Figure 4 when viewed on the plane 4—4 of Figure 1. From Figures 1 and 4, and also Figure 2, it is seen that when in its lowermost position, the ball 94 is seated in the upper flared opening of the vertical fluid bore 98 which connects the communicating bore 90 with the ball cage 92, so that oil under pressure sufficient to lift the valve ball 94 off its seat, will flow upwards into the cage recess 92, and thence upwards through the small vertical fluid bore 100 connecting the cage recess 92 and the space above the pump cylinder and containing the spring 72, in the bore 62, and the chamber 102 surrounding the plunger extension 88, inside the cylindrical solenoid plunger housing 104. The housing 104 is formed of non-magnetic material, such as brass, for example, to allow the magnetic flux to pass into the ferrous solenoid plunger 88 when the solenoid 106 is electrically energized from a power source through lead wires 108 connected to its coil 110.

The coil 110 is surrounded by a ferrous core 112 and has a ferrous core extension 114 extending inside the axial bore formed through the coil 110 as shown in Figures 1 and 6. A screw 116 holds the core extension 114 in position, and a non-magnetic stop lug 118 is immovably disposed in the axial bore of the core extension as shown, and extends therebelow, to prevent magnetic sticking or adhesion of the upper end of the ferrous solenoid plunger 88 when it moves upwards to the dotted line position shown at 119 which is the uppermost limit of travel of the plunger 88 when the solenoid coil 110 is actuated to draw the plunger 88 upwards in accord with well known electro-magnetic principles, carrying with it the collar 86 and the pump piston 84 on the upstroke, the lower end of the pump piston thus moving upwards in its cylinder bore to an upper position indicated in broken lines as at 120, in Figure 1.

The operation of the pumping device may be described briefly as follows. When the solenoid coil 110 is electrically energized by any suitable means, either manually switched, or automatically switched, the solenoid plunger assembly 88, 86 and piston 84, all integral or mutually attached to each other, move upwards as seen in Figure 1, and the resulting vacuum produced in the pump cylinder below the piston 84 causes a slug of oil from reservoir 10 to be drawn in through check valve 54, pipe 50 fluid inlet bore 42 and connecting bore eccentric 90 in the direction of the arrow shown in eccentric bore 90 in Figure 1, thus filling the cylinder 80 below the piston 84 with oil.

Then the solenoid coil 110 is de-energized, allowing the plunger 88, collar 86 and piston 84 to fall by gravity to their original positions shown in full lines in Figure 1. The weight of the plunger 88, collar 86 and piston 84 compresses the oil which has been drawn into the bottom of the pump cylinder 80, and, since the one way check valve 54 will not permit the oil to return therepast in a rightward direction, the oil must flow upwards through connecting bore 98, pushing against and unseating valve ball 94 and entering the cage recess 92, and thence flowing further upwards through bore 100 and into the space 62 above the cylinder member 66 and surrounding the plunger 88, inside the casing 104.

Now, when the solenoid coil 110 is again energized, the plunger 88, collar 86, and piston 84 move upwards again to the dotted line position the top of which is indicated at 119, in Figure 1, compressing the oil which fills the space surrounding the plunger 88. This oil cannot flow downwards again through the opening 98, since the valve wall 94 is seated so as to close the opening 98, and hence the oil flows downwards through chordal passageway 78, and out in a leftward direction through discharge outlet 44 in the direction of arrow 130, and through check valve 56, and upwards through pipe 30 to the bearing 14 as already described.

This process of reciprocation of the piston-plunger assembly 88, 86 and 84 continues either successively, or at any predetermined intervals, or as needed, and may be performed by actuating the solenoid coil manually, or automatically.

Although I have described my invention in specific terms, it will be understood that various changes may be made in size, shape, materials and arrangements without departing from the spirit and scope of the invention as claimed.

I claim:

1. A pumping device comprising a lower housing having fluid inlet and outlet openings in axial alignment, a cylinder formed therein with its axis perpendicular to the axis of said fluid inlet and outlet openings, a pumping piston slidable in said cylinder, a motion limiting collar carried by said pumping piston to block motion by said piston into said cylinder beyond a predetermined clearance space, an upper housing carried by said lower housing and having a bore formed therethrough in axial alignment with said pumping cylinder and piston, a solenoid coil extending around said upper housing bore, a solenoid plunger disposed in said upper housing bore and engaged with said pumping piston for movement therewith, connecting duct means communicating between said fluid inlet opening and said clearance space below said pumping piston, and in alignment with the axis of said fluid inlet opening, intermediate chamber means formed in said lower housing and having a fluid intake passage communicating with said connecting duct means and having a fluid outgo passage communicating with said upper housing bore, normally closed valve means normally blocking said fluid intake passage upon suction stroke of said pumping piston, and opening upon pressure stroke of said pumping piston, and spring means acting between said upper housing and said pumping cylinder, with outlet duct means communicating between said upper housing bore and said fluid outlet means.

2. The construction according to claim 1, wherein there is a check valve interposed in said fluid inlet opening.

3. The construction according to claim 1, wherein there is a check valve interposed in said fluid outlet opening.

4. The construction according to claim 1, wherein there is a check valve interposed in said fluid inlet opening and another check valve interposed in said fluid outlet opening, both check valves being oriented for unidirectional flow in the same direction, through said housing.

5. A pumping device comprising a housing, fluid inlet means in said housing and connectable to a source of fluid, fluid outlet means in said housing and connectable to a pipe to carry fluid away from said housing, cylinder means disposed inside said housing, first duct means communicating between said fluid inlet means and said cylinder means at one end of said cylinder means, piston means movably disposed in said cylinder means, intermediate chamber means formed in said housing, second duct means connecting said intermediate chamber means with said fluid outlet means, piston extension means carried by and movable with said piston means and extending into said intermediate chamber means, third duct means interconnecting said end of said cylinder means with said intermediate chamber means, normally closed valve means constructed and arranged in said third duct means to block passage of fluid therethrough, whereby, upon movement of said piston means away from said cylinder means end, a quantity of fluid is drawn through said fluid inlet means into said cylinder end, and whereby, upon movement of said piston means in a direction toward said cylinder end, said fluid is impelled through said third duct means and into said intermediate chamber means, and whereby, upon movement of said piston extension means when said piston means moves away from said cylinder means end, said fluid is impelled out of said intermediate chamber means and through said fluid outlet means and out of said housing, and wherein said intermediate chamber means comprises a plunger housing having a substantially cylindrical plunger receiving chamber formed therein, and in which said piston extension means comprises a substantially rectangular solenoid plunger of magnetic material, a solenoid coil engaging said plunger housing so as to enclose the same, said parts being so constructed and arranged that upon electrically energizing said solenoid coil, a magnetic flux is created which draws said piston extension means into said intermediate chamber in compressment of any fluid disposed therein, so as to impel said fluid out through said fluid outlet means, and wherein said third duct means comprises cage chamber means, cage inlet and outlet means communicating respectively between said cylinder end and said cage chamber means, and between said cage chamber means and said intermediate chamber means, valve means normally blocking flow of fluid from said cylinder end into said cage chamber means, and constructed and arranged that upon return motion of said piston means toward said cylinder end means, said fluid drawn into said cylinder means end is impelled through said now opened valve means into said cage chamber means and therethrough into said intermediate chamber means, and whereby, upon motion of said piston means away from said cylinder means end, said valve means returns to closed position.

6. The construction according to claim 5, characterized further in that there is a one way valve interposed between the said fluid inlet means and said fluid source, and permitting fluid flow only toward said fluid inlet means, and in which there is a one way valve interposed between said fluid outlet means and said pipe connectable to a member to be supplied with fluid by said pumping device, and permitting fluid flow only outwardly from said fluid outlet means away from said pumping device.

References Cited in the file of this patent

UNITED STATES PATENTS

| | | |
|---|---|---|
| 496,331 | Van Depoele | Apr. 25, 1893 |
| 1,304,843 | Zacharias | May 27, 1919 |
| 1,632,771 | Bijur | June 14, 1927 |
| 1,655,825 | Schmidt | Jan. 10, 1928 |
| 2,382,426 | Kocher | Aug. 14, 1945 |